United States Patent [19]

Straayer

[11] 4,099,829
[45] Jul. 11, 1978

[54] FLAT FIELD OPTICAL SCANNING SYSTEM

[75] Inventor: Ronald Jack Straayer, Melbourne Beach, Fla.

[73] Assignee: Harris Corporation, Cleveland, Ohio

[21] Appl. No.: 771,068

[22] Filed: Feb. 23, 1977

[51] Int. Cl.² .............................................. G02B 27/17
[52] U.S. Cl. ........................................ 350/6.1; 350/6.6; 358/143
[58] Field of Search ................... 350/6, 7, 8, 175 SL, 350/22, 62, 237, 175 SF, 181; 358/143, 280

[56] References Cited

U.S. PATENT DOCUMENTS

| | | | |
|---|---|---|---|
| 3,087,987 | 4/1963 | Stone | 350/7 |
| 3,172,941 | 3/1965 | Norman | 350/8 |
| 3,520,586 | 7/1970 | Bousky | 350/7 |
| 3,870,394 | 3/1975 | Ploeckl | 350/7 |
| 3,973,825 | 8/1976 | Starkweather | 350/6 |
| 4,019,804 | 4/1977 | Collier | 350/7 |

Primary Examiner—John K. Corbin
Assistant Examiner—B. W. delos Reyes
Attorney, Agent, or Firm—Craig & Antonelli

[57] ABSTRACT

An optical system for scanning a light beam on a flat field surface includes a source of a diverging light beam, a scanner for redirecting the light beam over the surface of the flat field and a single converging meniscus lens disposed in the optical path between the scanner and the flat field surface for focusing the diverging light beam as a point at all locations on the flat field. The diverging light beam which may be from a laser light source and the scanner have the effect of making the source appear to move along a spherical path which compensates for the petzval curvature of the converging lens, thereby providing focusing on a flat field surface with a single focusing element.

13 Claims, 1 Drawing Figure

U.S. Patent     July 11, 1978     4,099,829
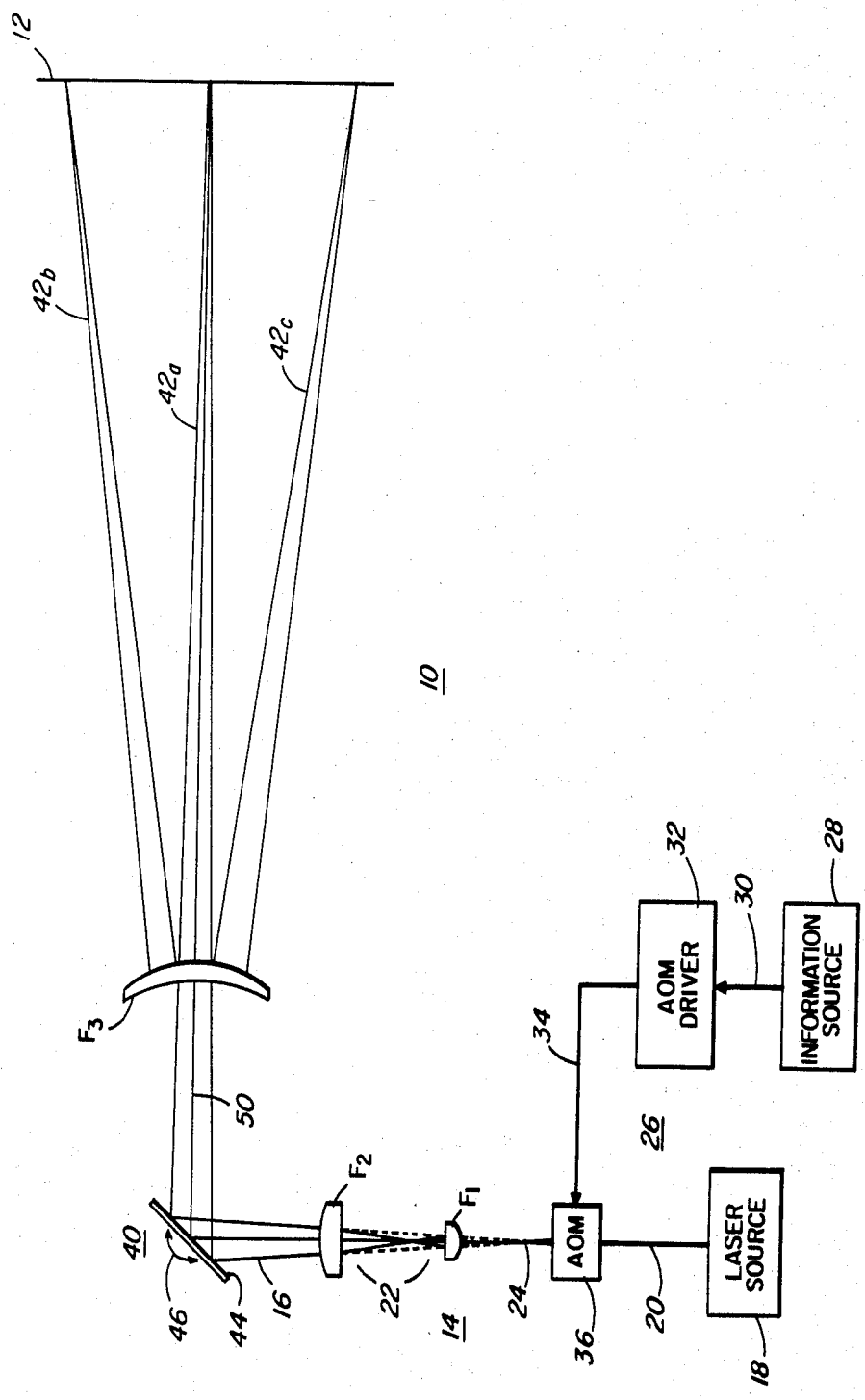

FLAT FIELD OPTICAL SCANNING SYSTEM

BACKGROUND OF THE INVENTION

The present invention relates to optical scanning systems and, more specifically, to scanning systems and methods in which a light beam is scanned over a flat surface.

In optical scanning systems, such as those for use in printing, facsimile and data recording, an information containing, modulated light beam is directed onto a surface at which an image of the information is formed. It is desirable to be able to properly focus a light beam over the entire image surface to provide the desired degree of resolution for good image reproduction. The image surface, which may be photographic film or paper, in these systems may be either curved or flat. An example of a known optical scanning system utilizing a curved image surface is disclosed in the U.S. Pat. No. 3,520,586 to Bousky. It is desirable however to have an optical scanning system which can properly focus a light beam on a flat surface because, for example, a flat image surface is less complicated to implement than a curved image surface. More specifically, an image field which is not flat projected onto a plane will result in loss of resolution at certain points along the field. An attempt to correct this loss of resolution may be to curve the platen but this approach leads to an excessively complicated platen design and paper handling assembly.

Optical scanning systems are known wherein a light beam is scanned over a flat image surface. In a typically known optical scanning system, a beam of collimated radiation from a source is directed toward a scanning device, which in turn redirects the collimated light beam to a multi-element lens assembly that focuses the collimated light beam on a flat field. The multi-element lens assembly was considered necessary to provide the degrees of freedom needed to achieve the desired focal power and to correct for lens aberrations, such as astigmatism, spherical aberration, comma and petzval curvature. For example, the collimated beam of light, when scanned, appears to the focusing lens assembly as radiating from a flat surface. Therefore, the focusing lens assembly is required to overcome the petzval curvature effect in which a flat surface is imaged as a curved surface. As a result, the number of corrections required to be made in such an optical scanning system and the number of degrees of freedom available for optical design have necessitated a multi-element lens assembly if an undesirable compromise in the optical design is to be avoided.

However, the multi-element lens approach is expensive, not only due to the number of elements required, but also due to the added accuracy to which the lens surfaces are required to be polished. As a general rule, the larger the number of elements, the higher the degree of accuracy needed in surface polishing because the defects in such surfaces generally tend to be accumulative rather than canceling.

In the case of coherent light, such as that from lasers, a multi-element lens tends to create further problems because any imperfections in the surfaces create an undesirable scattering effect which results in undesirable beam interference patterns. In addition, the greater the number of optical elements, the more surfaces there are available for dust collection, which also scatters coherent light and also creates interference problems.

SUMMARY OF THE INVENTION

It is an object of the present invention to provide an improved optical system for scanning a light beam on a flat image surface.

It is an additional object to provide an improved optical system for scanning a laser light beam on a flat image surface in which a single element lens is utilized to obtain a resolution of greater than 1000 lines per inch.

It is still another object of the invention to provide an improved method of optical scanning on a flat field surface.

It was recognized that if a spherical surface was used as the effective source of radiation for the optical scanning system rather than a flat surface in the known systems, the petzval curvature effect could be compensated for by optical geometry, and therefore, an additional degree of freedom would be provided for the design of the optical system. As a result, it has been found that a single element lens, preferably a converging meniscus lens, can provide the focal power and the required aberration corrections, thereby providing a more economical optical system and avoiding the problems associated with multi-element optical arrays. The spherical surface effect is obtained by directing a diverging beam of radiation, rather than the known collimated beam, towards the scanning device. The combination of the diverging beam and the scanner, in effect, functions to provide a spherical radiation source, which as a result of the petzval curvature effect is focused as a flat field image. The invention therefore uses optical geometry to correct for field curvature instead of correction with a lens system.

According to the present invention, there is provided an optical scanning system for scanning a light beam on a flat field surface. The system includes a source of a diverging light beam, a device disposed in the path of the diverging light beam for scanning the light beam on the flat surface and a single element lens for focusing the diverging beam onto the flat surface. The diverging light beam and the scanning device are effective to make the light source appear to be moving along a spherical surface shaped so as to compensate the petzval curvature effect of the single element lens.

In a preferred form of the optical scanning system of the present invention, the diverging light beam is a diverging laser beam and the single element lens is a converging meniscus lens disposed between the flat field surface and the scanning device.

BRIEF DESCRIPTION OF THE DRAWING

In the drawing, the sole FIGURE is a diagram of an optical scanning system according to the present invention.

DESCRIPTION OF THE PREFERRED EMBODIMENT

In an exemplary embodiment of the present invention, as illustrated in the FIGURE of the drawing, there is shown an optical system, represented generally by the reference numeral 10, for scanning a light beam on a flat field surface. In the embodiment the optical system 10 is a recording optical system but it is to be understood that the invention is equally applicable to a playback optical system. The flat field surface is represented by the reference numeral 12 and includes a light sensitive material, such as photographic paper or film. The system 10 also includes a source 14 of a diverging light beam 16. Preferably, this source 14 includes a laser light source 18 but it is to be understood that the principle of the present invention is applicable for use with non-coherent light sources. The laser light source 18 produces a collimated laser light beam 20 which after being modulated is directed to a device for converting the collimated laser beam into the diverging laser beam 16. This device may include a telescope 22 comprising lens $F_1$ and lens $F_2$. The telescope 22 is chosen and adjusted to project a virtual point source, shown at 24, to the flat field lens in order to conserve optical path. The focal lengths of lenses $F_1$ and $F_2$ are selected, in a manner well known to those skilled in the art, as a function of the geometry, resolution and input beam size of the optical scanning system. In the embodiment the diverging laser beam 16 is shown as being substantially parallel to the plane defined by the flat field surface 12. When the optical scanning system 10 is used in the recording mode as shown in the FIGURE, the system includes a means 26 disposed in the path of the laser beam 20 between the source 18 and the telescope 22 for modulating the laser beam with information. The modulating means 26 includes a source 28 of information which is in digital or analog electrical form whose output at 30 is coupled to a suitable driver 32. The output shown at 34 is in turn coupled to a modulating device, preferably an acousto-optic modulator (AOM) 36.

Disposed in the path of the diverging light beam 16 is a scanning device 40 which scans the light beam over the surface of the flat field 12, as illustrated by the light beams 42a, 42b, and 42c. In the embodiment, the scanning device 40 has a nominal angle of 45° with respect to the diverging light beam 16 so that the diverging light beam is deflected through a nominal angle of 90° to impinge upon the flat field surface 12. Preferably, the scanner 40 is a galvanometer having a reflective mirrored surface 44. The surface 44 is rotated back and forth as illustrated at 46. It is to be understood that other scanning devices may be used, such as a rotating mirror scanner, an acousto-optic beam deflector, and a rotating polygon. Suitable means not shown are provided for synchronizing the rotation of the reflective surface 44 to the translational movement of the flat field surface 12 which in the FIGURE is in a direction normal to the drawing.

According to the invention, there is provided a single focusing element lens $F_3$, disposed in the path of the deflected diverging light beam 16 for focusing the beam at the flat field surface 12. The lens 22 is a converging lens and preferably a converging meniscus lens. In operation, the diverging laser beam 16 and the scanner 40 are effective to make the effective laser beam source appear to be moving along a spherical surface (not shown) so that due to the petzval curvature effect of the converging lens $F_3$ the laser light beam is focused on the flat field surface 12. Moreover, the geometry of this scanning system is selected so that the radius of this apparent spherical surface has a radius substantially equal to the distance between the virtual point source 24 of the diverging light beam 16 and the scanner 40. Stated differently, the operation of the optical system can be equivalently represented by eliminating the scanner 40 and by placing the virtual point source directly to the left of the lens $F_3$ and by moving the point source along a spherical surface having a radius equal to the distance from the source to the scanner. The apparent spherical surface is such as to be intersected at a right angle with a leftward extension of the optical axis 50.

The separation between the converging lens $F_3$, the flat field surface 12, the scanner 40 and the virtual point source 24 are related according to the following equations.

$$(1/l_1'l_2) + (1/l_3) = 1/F$$

and $$l_1 = F \cdot n$$

where
- $l_1$ is the separation between the scanner 40 and the virtual point source 24 of the diverging laser beam
- $l_2$ is the separation between the converging lens $F_3$ and the scanner 40
- $l_3$ is the separation between the converging lens $F_3$ and the flat field surface 12
- $F$ is the focal length of the converging lens $F_3$
- $n$ is the index of refraction of the converging lens $F_3$ In the design of the converging meniscus lens $F_3$, the lens is made of glass having a high index of refraction to minimize spherical aberration, has a radii ratio effective to eliminate astigmatism, and has an entrance pupil position chosen to eliminate coma at the half field angle.

The embodiment of the present invention is intended to be merely exemplary and those skilled in the art shall be able to make numerous variations and modifications of it without departing from the spirit and scope of the present invention. All such variations and modifications are intended to be within the scope of the present invention as defined by the appended claims.

I claim:

1. An optical system for scanning a light beam on a flat field surface comprising:
   a. means supplying a diverging laser light beam,
   b. means disposed in the path of the diverging light beam for scanning the light beam on the flat surface,
   c. a converging lens disposed between the flat field surface and the scanning means and in the path of the diverging laser light beam for focusing the beam at the flat field surface as the beam is scanned, and
   d. the diverging laser light beam and the scanning means being positioned to make the effective laser beam source appear to be moving along a spherical surface having a radius equal to the distance between the beam supplying and the scanning means so that due to the petzval curvature effect of the converging lens the laser light beam is focused equally on all points of the flat field surface.

2. The optical system according to claim 1 wherein
   a. the means supplying a diverging laser beam includes
      1. a source of a collimated laser beam and
      2. a telescope means disposed in the path of the collimated laser beam for producing the diverging laser beam, and wherein
   b. the converging lens is a converging meniscus lens.

3. The optical system according to claim 2 wherein the separation between the converging lens, the flat field surface, the scanning means and the means supplying the diverging laser beam are such as to substantially follow the relationships $$(1/l_1+l_2) + 1/l_3 = 1/F$$

and $$l_1 = F \cdot n$$

where
- $l_1$ is the separation between the scanning means and a virtual point source of the diverging laser beam supplying means
- $l_2$ is the separation between the converging lens and the scanning means
- $l_3$ is the separation between the converging lens and the flat field surface
- $F$ is the focal length of the converging lens
- $n$ is the index of refraction of the converging lens.

4. The optical system according to claim 3 further including means disposed in the path of the laser light beam between the source and the telescope means for modulating the laser beam with information.

5. An optical scanning system comprising:
   a. a source of a collimated coherent laser light beam,
   b. a telescoping means disposed in the path of the collimated laser beam for producing a diverging laser beam,
   c. a flat field surface positioned to have the laser beam imaged thereon, the plane of the flat field surface being displaced from and substantially parallel to the diverging laser beam,
   d. a galvanometer scanning device having a rotational reflective surface disposed in the path of the diverging laser beam at a nominal angle of about 45° to deflect the laser beam onto the flat field surface, the beam being scanned across the surface in response to rotation of the reflective surface of the galvanometer,
   e. a converging meniscus lens disposed in the path of the diverging laser beam between the galvanometer and the flat field surface to focus the diverging laser beam onto the flat field surface at all scan angles, and
   f. the diverging laser beam and the galvanometer scanner being relatively positioned to make the effective diverging laser light source appear to be moving along a spherical surface having a radius substantially equal to the distance between a virtual point source associated with the telescope means and the galvanometer scanner so that due to the petzval curvature effect of the converging meniscus lens, the laser beam is focused on the flat field surface at all scan positions, the apparent spherical surface being located so as to be intersected by an extension of the optical axis of the converging lens at substantially a right angle.

6. A method of optical scanning on a flat field surface comprising the steps of:
   a. generating a diverging laser beam,
   b. scanning the diverging laser beam onto the flat field surface and
   c. focusing the scanned diverging laser beam onto the flat field surface with a converging lens located in the path of the laser beam between the locations of the flat field surface and the point of scanning to make the diverging laser beam appear to be moving along a spherical surface so that due to the petzval curvature effect of the converging lens the light beam is focused on the flat field surface.

7. An optical system for illuminating a flat field surface comprising:
   means providing a scanning light beam for scanning said flat field surface; and
   a single element lens disposed in the path of said scanning light beam for focusing the beam at the flat field surface as the beam is scanned;
   said means providing a scanning light beam comprising means providing a light source in the form of an apparent image of a point of light moving along a spherical surface having a shape which compensates the petzval curvature effect of said single element lens.

8. An optical system according to claim 7, wherein said means providing a scanning light beam comprises means supplying a diverging light beam and means disposed in the path of the diverging light beam at a predetermined distance from the source of said diverging light beam for scanning the light beam on the flat field surface.

9. The optical scanning system according to claim 8 wherein the converging lens is a converging meniscus lens.

10. The optical scanning system according to claim 9 wherein the radius of the spherical surface is substantially equal to the distance between the diverging beam supplying means and the scanning means.

11. The optical scanning system according to claim 10 wherein the scanning means includes a galvanometer having a rotatable reflective surface.

12. The optical scanning system according to claim 7 wherein the diverging light beam supplying means comprises:
   a. a source of a collimated laser light beam and
   b. focusing means on the path of the collimated laser beam for diverging the laser beam.

13. The optical scanning system according to claim 12 wherein the focusing means for creating the diverging laser light beam includes a telescope.

* * * * *